US011533288B1

(12) United States Patent
Mascia

(10) Patent No.: US 11,533,288 B1
(45) Date of Patent: Dec. 20, 2022

(54) USING NATURAL LANGUAGE PROCESSING TO ENABLE COMMUNICATION ACROSS MESSAGING PLATFORMS

(71) Applicant: Capital One Services, LLC, McLean, VA (US)

(72) Inventor: Catelyn Mascia, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/350,477

(22) Filed: Jun. 17, 2021

(51) Int. Cl.
| | | |
|---|---|---|
| *H04L 12/58* | (2006.01) | |
| *G06F 40/279* | (2020.01) | |
| *G06Q 10/10* | (2012.01) | |
| *G06Q 50/00* | (2012.01) | |
| *G06F 21/44* | (2013.01) | |
| *H04L 51/56* | (2022.01) | |
| *H04L 51/18* | (2022.01) | |
| *H04L 9/40* | (2022.01) | |

(52) U.S. Cl.
CPC ............. *H04L 51/56* (2022.05); *G06F 21/44* (2013.01); *G06F 40/279* (2020.01); *G06Q 10/1095* (2013.01); *G06Q 10/1097* (2013.01); *H04L 51/18* (2013.01); *H04L 63/102* (2013.01)

(58) Field of Classification Search
CPC ....... H04L 51/36; H04L 51/18; H04L 63/102; G06F 40/279; G06F 21/44; G06Q 10/1095; G06Q 10/1097
See application file for complete search history.

(56) References Cited

U.S. PATENT DOCUMENTS

| | | | |
|---|---|---|---|
| 8,433,797 B2* | 4/2013 | Vendrow | H04L 67/02 709/224 |
| 9,076,125 B2* | 7/2015 | Manolescu | G06Q 10/107 |
| 9,438,554 B2 | 9/2016 | Fleck et al. | |
| 9,838,747 B2 | 12/2017 | Olague et al. | |
| 10,097,486 B1 | 10/2018 | Rosen et al. | |
| 10,346,937 B2 | 7/2019 | Ford | |
| 10,567,485 B2 | 2/2020 | Mantrana-Exposito | |
| 10,915,866 B2* | 2/2021 | Bay | H04L 51/046 |
| 11,082,387 B1* | 8/2021 | Vukich | H04L 51/26 |
| 2014/0379814 A1* | 12/2014 | Graff | H04M 1/72451 715/753 |
| 2016/0034318 A1 | 2/2016 | Byreddy et al. | |

(Continued)

*Primary Examiner* — Esther B. Henderson
*Assistant Examiner* — Nazia Naoreen
(74) *Attorney, Agent, or Firm* — Harrity & Harrity, LLP

(57) ABSTRACT

A user device may detect a message received via a messaging platform of one or more messaging platforms. The user device may determine that the message is from a second user based on a match between a user identifier associated with the message and a second user identifier corresponding to the messaging platform for the second user. The user device may transmit message data that includes: message content of the message, and information that identifies the messaging platform used to transmit the message. The user device may receive task information that indicates a task type for a task determined from the message content, a task priority for the task, and information that identifies the second user, and information that identifies the messaging platform. The user device may present the task information via a user interface of the cross-platform messaging application executing on the user device.

20 Claims, 10 Drawing Sheets

(56) References Cited

U.S. PATENT DOCUMENTS

| | | |
|---|---|---|
| 2017/0161372 A1 | 6/2017 | Fernandez et al. |
| 2018/0063070 A1* | 3/2018 | Zucker .................... H04L 51/56 |
| 2018/0067761 A1* | 3/2018 | Cattermole ............... G06F 9/46 |
| 2018/0130007 A1* | 5/2018 | Fowler ............... G06Q 10/1095 |

* cited by examiner

500 ⟶

510 — Transmit, by a user device, a request that includes a login credential associated with a first user of a cross-platform messaging application executing on the user device, wherein the first user is associated with a set of first user identifiers for a corresponding first set of messaging platforms 520 — Receive, by the user device and based on transmitting the request, a response that indicates one or more messaging platforms and a respective second user identifier, associated with a second user, for each of the one or more messaging platforms 530 — Detect, by the user device, a message received via a messaging platform of the one or more messaging platforms 540 — Determine, by the user device, that the message is from the second user based on a match between a user identifier associated with the message and the respective second user identifier corresponding to the messaging platform for the second user 550 — Transmit, by the user device and based on determining that the message is from the second user, message data that includes message content of the message, and information that identifies the messaging platform used to transmit the message 560 — Receive by the user device and based on transmitting the message data, task information that indicates a task type for a task determined from the message content, a task priority for the task, and information that identifies the second user, and information that identifies the messaging platform 570 — Present, by the user device, the task information via a user interface of the cross-platform messaging application executing on the user device

FIG. 5

USING NATURAL LANGUAGE PROCESSING TO ENABLE COMMUNICATION ACROSS MESSAGING PLATFORMS

BACKGROUND

A messaging platform facilitates communication of messages between user devices of users of the messaging platform. A messaging platform may include an email messaging platform, a text messaging platform, and/or a chat messaging platform, among other examples.

SUMMARY

In some implementations, a system for using natural language processing to enable communication across messaging platforms includes one or more memories and one or more processors, communicatively coupled to the one or more memories, configured to: receive registration information that identifies: a first set of messaging platforms and a respective first user identifier, of a first user, for each messaging platform included in the first set of messaging platforms, wherein the first set of messaging platforms includes at least two messaging platforms, and a second set of messaging platforms and a respective second user identifier, of a second user, for each messaging platform included in the second set of messaging platforms, wherein the first user is associated with a first role that supports a second role of the second user; receive, from a user device associated with the first user, a request that includes a login credential associated with the first user for a cross-platform messaging application; transmit, to the user device and based on receiving the request, a response that indicates the second set of messaging platforms and the respective second user identifier for each messaging platform included in the second set of messaging platforms; receive, from the user device and based on transmitting the response, message data that includes: message content of a message, from the second user to the first user, transmitted to the user device via a messaging platform of the second set of messaging platforms, and information that identifies the messaging platform; extract task information from the message content using natural language processing, wherein the task information indicates a task type for a task determined from the message content, a task priority for the task, and information that identifies the second user; and transmit, to the user device: the task information to cause the task information to be presented via a user interface of the cross-platform messaging application, and information that identifies the messaging platform, to enable the user device to communicate using cross-platform messaging via the cross-platform messaging application.

In some implementations, a method for communicating across messaging platforms includes transmitting, by a user device, a request that includes a login credential associated with a first user of a cross-platform messaging application executing on the user device, wherein the first user is associated with a set of first user identifiers for a corresponding first set of messaging platforms; receiving, by the user device and based on transmitting the request, a response that indicates one or more messaging platforms and a respective second user identifier, associated with a second user, for each of the one or more messaging platforms; detecting, by the user device, a message received via a messaging platform of the one or more messaging platforms; determining, by the user device, that the message is from the second user based on a match between a user identifier associated with the message and the respective second user identifier corresponding to the messaging platform for the second user; transmitting, by the user device and based on determining that the message is from the second user, message data that includes: message content of the message, and information that identifies the messaging platform used to transmit the message; receiving, by the user device and based on transmitting the message data: task information that indicates a task type for a task determined from the message content, a task priority for the task, and information that identifies the second user, and information that identifies the messaging platform; and presenting, by the user device, the task information via a user interface of the cross-platform messaging application executing on the user device.

In some implementations, a non-transitory computer-readable medium storing a set of instructions includes one or more instructions that, when executed by one or more processors of a user device, cause the user device to: transmit a request that includes a login credential associated with a first user of a cross-platform messaging application executing on the user device, wherein the first user is associated with a set of first user identifiers for a corresponding first set of messaging platforms; receive, based on transmitting the request, a response that indicates one or more messaging platforms and a respective second user identifier, associated with a second user, for each of the one or more messaging platforms; detect a message received via a messaging platform of the one or more messaging platforms; determine that the message is from the second user based on a match between a user identifier associated with the message and the respective second user identifier corresponding to the messaging platform for the second user; transmit, based on determining that the message is from the second user, message data that includes: message content of the message, and information that identifies the messaging platform used to transmit the message; receive, by the user device and based on transmitting the message data: task information that indicates a task type for a task determined from the message content, a task priority for the task, and information that identifies the second user, and information that identifies the messaging platform; and present the task information via a user interface of the cross-platform messaging application executing on the user device.

BRIEF DESCRIPTION OF THE DRAWINGS

FIGS. 4-5 are flowcharts of example processes relating to using natural language processing to enable communication across messaging platforms.

DETAILED DESCRIPTION

Figure 1A:
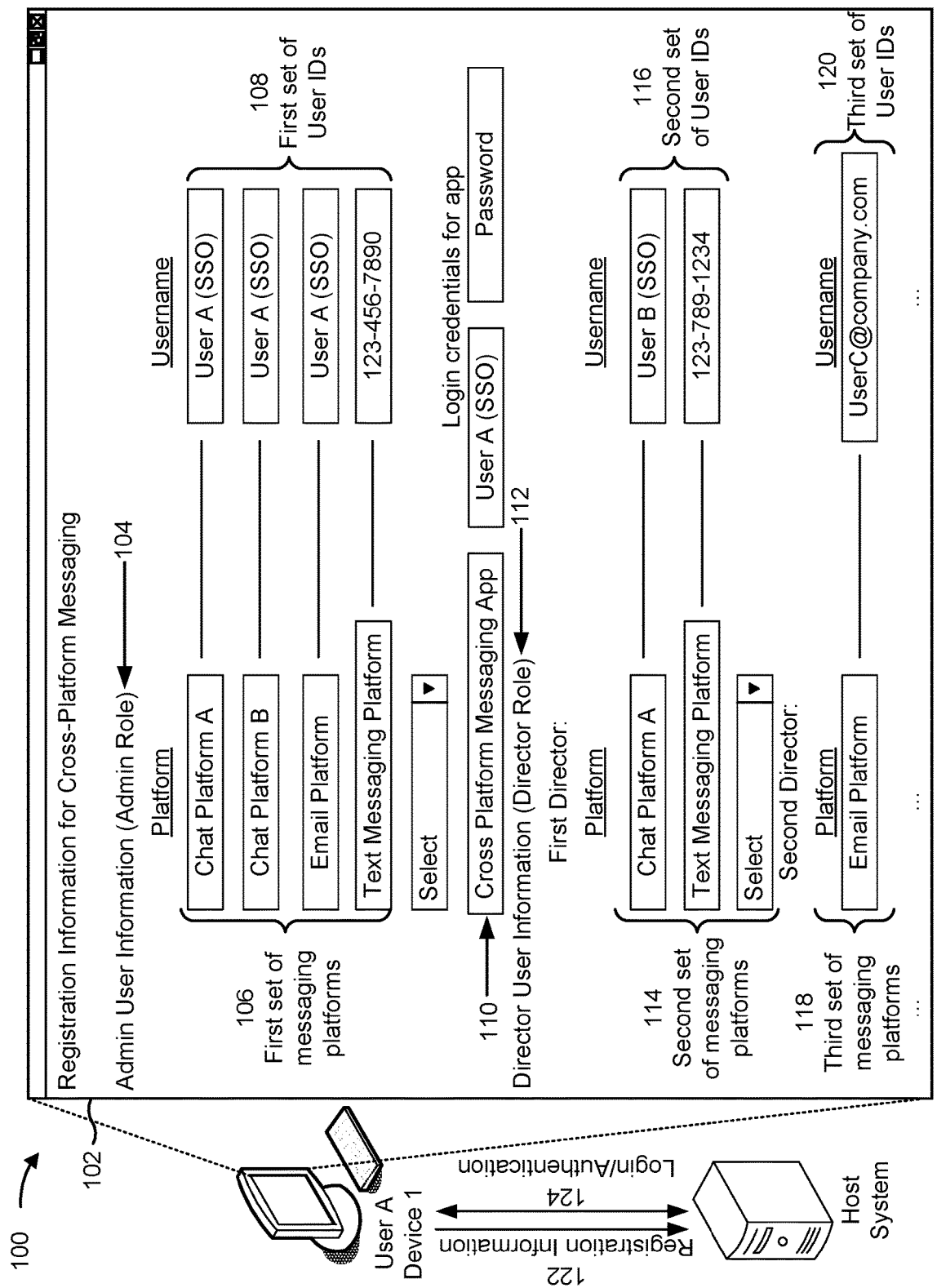
FIGS. 1A-1F are diagrams of an example implementation relating to using natural language processing to enable communication across messaging platforms.

The following detailed description of example implementations refers to the accompanying drawings. The same reference numbers in different drawings may identify the same or similar elements.

A messaging platform, such as an email messaging platform, a text messaging platform, and/or a chat messaging platform, allows users of the messaging platform to send messages to each other using respective user devices. Often, a user has a respective account with each of multiple messaging platforms, but can only send and receive messages associated with a particular messaging platform within the particular messaging platform. This can create complexity when the user is sending and receiving messages regarding a topic using a first messaging platform and also sending and receiving messages regarding the topic using a second messaging platform.

Further, the user may be associated with an entity (e.g., a company, an organization, and/or a university, among other examples) and may have an administrative role within the entity. For example, the user may provide administrative support to one or more other users that are associated with the entity and have roles, such as director roles, that are supported by the administrative role. Often, the user and the one or more other users may send and receive messages to each other via several different messaging platforms. For example, the user may communicate with a first other user using an email messaging platform, a second other user using a text messaging platform, a third other user using a chat messaging platform, a fourth other user using the email messaging platform and the chat messaging platform, and so on. This can be taxing on the user and may require use of computing resources (e.g., processing resources, memory resources, communication resources, and/or power resources, among other examples) of a user device of the user to monitor the different messaging platforms for messages from the one or more other users. Further, because of the administrative role of the user, messages from the one or more other users may indicate tasks that the user is to perform. Consequently, the user may use a spreadsheet, an application, or other computer program to keep track of the tasks that are assigned to the user, which further uses computing resources of the user device.

Some implementations described herein provide a user device that executes a cross-platform messaging application. The user device may obtain registration information from a user of the user device that indicates a first set of messaging platforms associated with the user (e.g., with which the user has a messaging account) and/or a second set of messaging platforms associated with another user that the user administratively supports. The user device may detect a message that is received via a particular messaging platform (e.g., that is included in the first set of messaging platforms and the second set of messaging platforms) and may determine that the particular message is from the other user (e.g., based on a user identifier associated with the message and a user identifier of the other user device associated with the particular messaging platform). The user device may process the particular message to generate message data and may transmit the message data to a natural language processing (NLP) system.

The NLP system may extract task information from the message using natural language processing. The task information may indicate, for example, a task type for a task determined from the message content, a task priority for the task, and information that identifies the other user (e.g., as the requester of the task). The NLP system may transmit the task information to the user device to cause the task information to be presented via a user interface of the cross-platform messaging application executing on the user device. The task information may be presented in a task list that may include a user input element that enables the user device to communicate messages via the cross-platform messaging application and using the particular messaging platform, which facilitates performance of the task indicated by the task information.

In this way, some implementations described herein monitor multiple messaging platforms, identify messages that indicate tasks that need to be performed, and present information to a user device of a user that needs to perform the tasks. Accordingly, the user device does not need to consume computing resources (e.g., processing resources, memory resources, communication resources, and/or power resources, among other examples) that would otherwise be used by the user manually checking the multiple messaging platforms (e.g., by executing applications associated with the multiple messaging platforms). Further, some implementations provide a centralized user interface to be presented on the user device, which allows the user to view a task list and to respond to messages associated with tasks of the task list in one location. In this way, the user device does not have to use a spreadsheet, an application, or computer program to keep track of tasks and does not have to execute applications associated with different messaging platforms to send or receive communications related to the tasks, which further reduces a use of computing resources of the user device that would otherwise be used.

FIGS. 1A-1F are diagrams of an example 100 associated with using natural language processing to enable communication across messaging platforms. As shown in FIGS. 1A-1F, example 100 includes a plurality of user devices (e.g., shown as a user A device 1, a user A device 2, a user B device 1, a user B device 2, a user C device, and a user D device), a host system, a natural language processing (NLP) system, and a plurality of databases (e.g., shown as a human resources (HR) database, a preferences database, an HR/contacts database, and a contacts database). These devices are described in more detail in connection with FIGS. 2 and 3.

As shown in FIG. 1A, a user device may execute a cross-platform messaging application. The cross-platform messaging application may be configured to facilitate messaging between different messaging platforms (e.g., between an email messaging platform, a text messaging platform, and/or a chat messaging platform, among other examples). A user of the user device may interact with a user interface of the cross-platform messaging application to provide information to the cross-platform messaging application and thereby enable the cross-platform messaging application to identify messages from one or more messaging platforms that are associated with the user and/or other people associated with the user.

For example, as shown in FIG. 1A, a user A of a user A device 1 (e.g., a first user device associated with the user A) may interact with a user interface 102 of the cross-platform messaging application. The user A may be associated with an entity (e.g., a company, an organization, and/or a university, among other examples) and may have an administrative role within the entity. For example, the user A may provide administrative support to one or more other users, such as user B, user C, and user D, that are associated with the entity and have roles, such as director roles, that are supported by the administrative role. Accordingly, as shown by reference number 104, the user A may provide information associated with the user A in an administrative user information section of the user interface 102.

For example, as further shown in FIG. 1A, and by reference number 106, the user A may provide information identifying a first set of messaging platforms (e.g., that includes at least two messaging platforms) with which the user A is associated (e.g., with which the user A has a messaging account). As shown by reference number 108, the user A may provide information identifying a first set of user identifiers that are associated with the user A and/or that respectively correspond to the set of messaging platforms (e.g., a user identifier of the first set of user identifiers may be used by the user A to log in to a messaging account of a corresponding messaging platform of the first set of messaging platforms). For example, as shown in FIG. 1A, the user A may provide information identifying a first set of messaging platforms that includes a Chat Platform A, a Chat Platform B, an Email Platform, and a Text Messaging Platform, and a corresponding first set of user identifiers that includes a User A single sign-on (SSO) user identifier for each of the Chat Platform A, the Chat Platform B, and the Email Platform, and a 123-456-7890 telephone number user identifier for the Text Messaging Platform.

In some implementations, as shown by reference number 110, the user A may provide, via the user interface 102, information that identifies one or more login credentials of the user A for the cross-platform messaging application. For example, as shown in FIG. 1A, the user A may provide information identifying the User A SSO user identifier and/or a password as login credentials for the cross-platform messaging application.

Additionally, or alternatively, the user A may provide, via the user interface 102, information associated with the one or more other users associated with the entity (e.g., the one or more other users, such as the user B, the user C, and the user D, that are supported by the user A). Accordingly, as shown by reference number 112, the user A may provide information associated with the user B and the user C in a director user information section of the user interface 102.

For example, as shown by reference number 114, the user A may provide information identifying a second set of messaging platforms with which the user B (e.g., a First Director) is associated (e.g., the Chat Platform A and the Text Messaging Platform), and, as shown by reference number 116, information identifying a second set of user identifiers that are associated with the user B and/or that respectively correspond to the second set of messaging platforms (e.g., a User B SSO user identifier and a 123-789-1234 telephone number user identifier). As another example, as shown by reference number 118, the user A may provide information identifying a third set of messaging platforms with which the user C (e.g., a Second Director) is associated (e.g., the Email Platform), and, as shown by reference number 120, information identifying a third set of user identifiers that are associated with the user B and/or that respectively correspond to the third set of messaging platforms (e.g., a UserC@company.com email address user identifier).

In some implementations, the user A device 1 (e.g., when executing the cross-platform messaging application) may process the information provided by the user A to generate registration information (e.g., that is associated with the user A, the user B, and/or the user C). For example, the registration information may identify the first set of messaging platforms and/or the first set of user identifiers; the second set of messaging platforms and/or the second set of user identifiers; and/or the third set of messaging platforms and/or the third set of user identifiers.

As further shown in FIG. 1A, and by reference number 122, the user A device 1 may transmit the registration information to the host system. For example, the user A device 1 may send the registration information to the host system via a network (e.g., the Internet) that connects the user A device 1 and the host system.

As further shown in FIG. 1A, and by reference number 124, the user A device 1 may communicate with the host system to allow the user A device 1 to log in to the cross-platform messaging application (e.g., to allow the user A device 1 to communicate with the NLP system, as described elsewhere herein). For example, the user A device 1 may transmit a request to the host system (e.g., via the network) for the user A device 1 to log in to the cross-platform messaging application. The request may include at least one login credential of the user A (e.g., one or more login credentials as described with respect to reference number 110).

The host system, based on receiving the request, may evaluate (e.g., using one or more authentication techniques) the at least one login credential and may authenticate the user A device 1, which may cause the user A device 1 to be logged in to the cross-platform messaging application. Additionally, or alternatively, the host system, based on receiving the request, may transmit a response to the user A device 1 (e.g., that includes information that may be used by cross-platform messaging application when executing on the user A device 1). The response may include some or all of the registration information. For example, the response may indicate one or more messaging platforms associated with another user (e.g., user B or user C) and respective user identifiers, associated with the other user, for each of the one or more messaging platforms (e.g., the response may indicate the second set of messaging platforms and/or the second set of user identifiers, and/or the third set of messaging platforms and/or the third set of user identifiers).

Figure 1B:
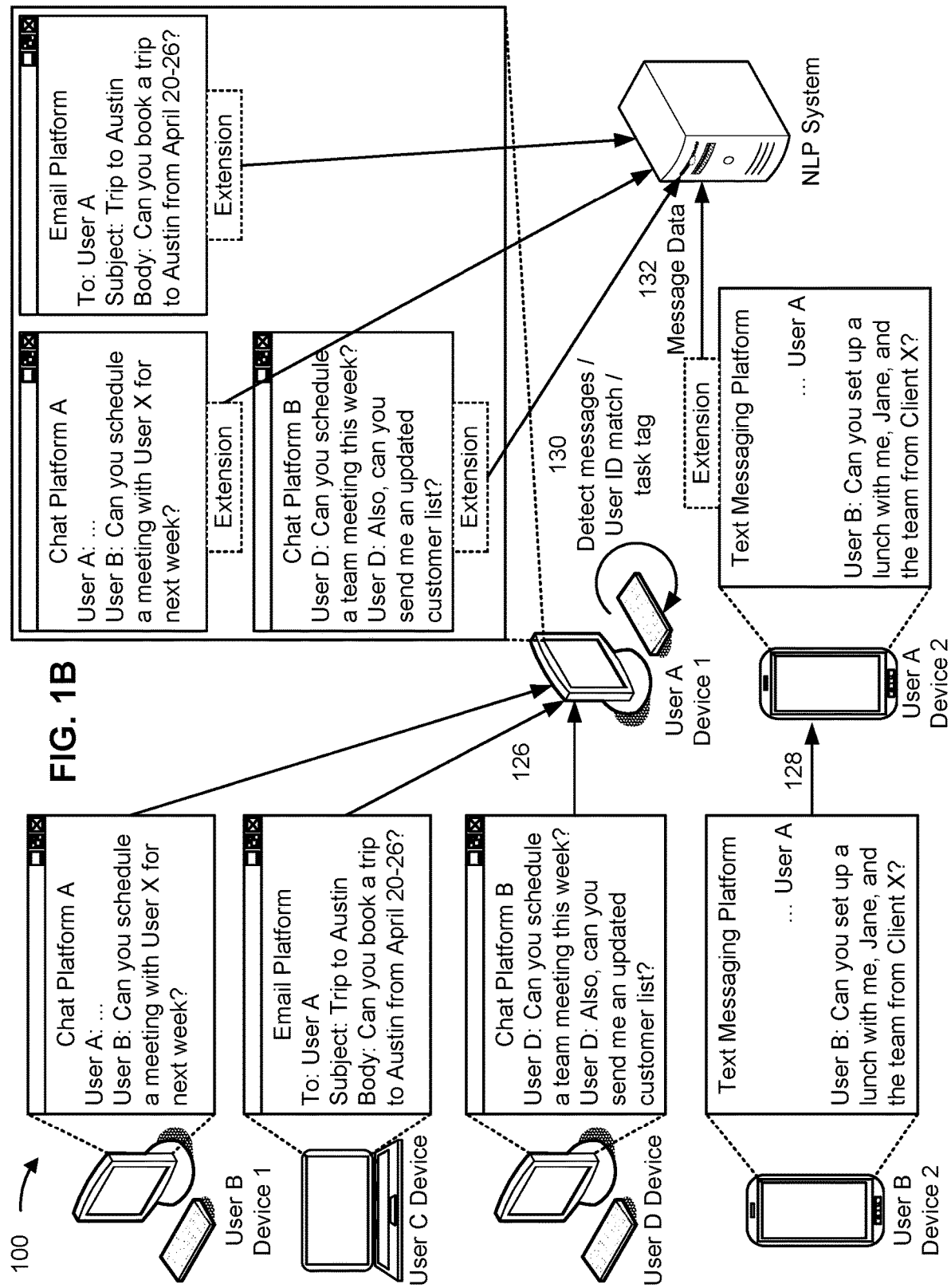

As shown in FIG. 1B, and by reference number 126 (e.g., after the user A device 1 has been logged in to the cross-platform messaging application), the user A device 1 may receive messages via at least some of the first set of messaging platforms with which the user A is associated. For example, as shown in FIG. 1B, the user A device 1 may receive a chat message from a user B device 1 (e.g., a first user device of the user B) via the Chat Platform A, an email message from a user C device (e.g., a user device of the user C) via the Email Platform, and/or a chat message from a user D device (e.g., a user device of a user D) via the Chat Platform B.

In some implementations, the user A may be associated with one or more additional user devices, such as a user A device 2 (e.g., a second user device of the user A). For example, the user A device 1 may be a desktop computer associated with the user A and the user A device 2 may be a mobile phone associated with the user. The user A device 2 may execute and/or log in to the cross-platform messaging application (e.g., in a similar manner as that described above in relation to FIG. 1A). In some implementations, messaging capabilities of the user devices of the user A may be different. For example, with reference to the first set of messaging platforms shown in FIG. 1A, the user A device 1 may be able to communicate messages associated with the Chat Platform A, the Chat Platform B, and the Email Platform, and the user A device 2 may be able to communicate messages associated with the Text Messaging Platform. Accordingly, as shown in FIG. 1B, and by reference number 128, the user A device 2 may receive messages via at least some of the first set of messaging platforms that are not received by the user A device 1. For example, the user A device 2 may receive a text message from a user B device 2 (e.g., a second user device of the user B) via the Text Messaging Platform.

As further shown in FIG. 1B, and by reference number 130, a user device associated with the user A (e.g., the user A device 1 or the user A device 2) may process (e.g., when executing the cross-platform messaging application) messages received by the user device to detect a message that was received via a messaging platform indicated by the response (e.g., that was received from the host system). For example, the user device may detect a message that was received via a messaging platform included in the second set of messaging platforms (e.g., that includes the Chat Platform A and the Text Messaging Platform) and/or the third set of messaging platforms (e.g., that includes the Email Platform). In some implementations, the user device may determine that the message is from a particular user associated with the entity (e.g., the user B or the user C). For example, the user device may determine whether a user identifier associated with the message (e.g., a sender user identifier of the message) matches a user identifier that corresponds to the messaging platform (e.g., as indicated by the response). Accordingly, when the user device determines that a match exists, the user device may determine that the message is from the particular user.

Additionally, or alternatively, the user device may determine whether the message includes a task tag. The task tag may be a flag (e.g., a/task flag, a/schedule flag, an/event flag, or a different flag) or another identifier included in the message that indicates that the message is to be processed to extract task information (e.g., as further described herein in relation to FIG. 1C). The user device may process (e.g., parse) the message to determine that the message includes the task tag.

As further shown in FIG. 1B, and by reference number 132, the user device may transmit message data associated with the message (e.g., based on determining that the message is from the particular user and/or determining that the message includes the task tag) to the NLP system. For example, the user device, when executing the cross-platform messaging application, may automatically obtain the message data from the message (e.g., via an extension associated with the messaging platform used to transmit the message) and may send the message data to the NLP system. The message data may include message content of the message (e.g., text content, image content, audio content, and/or video content, among other examples) and/or information that identifies the messaging platform used to transmit the message.

Figure 1C:
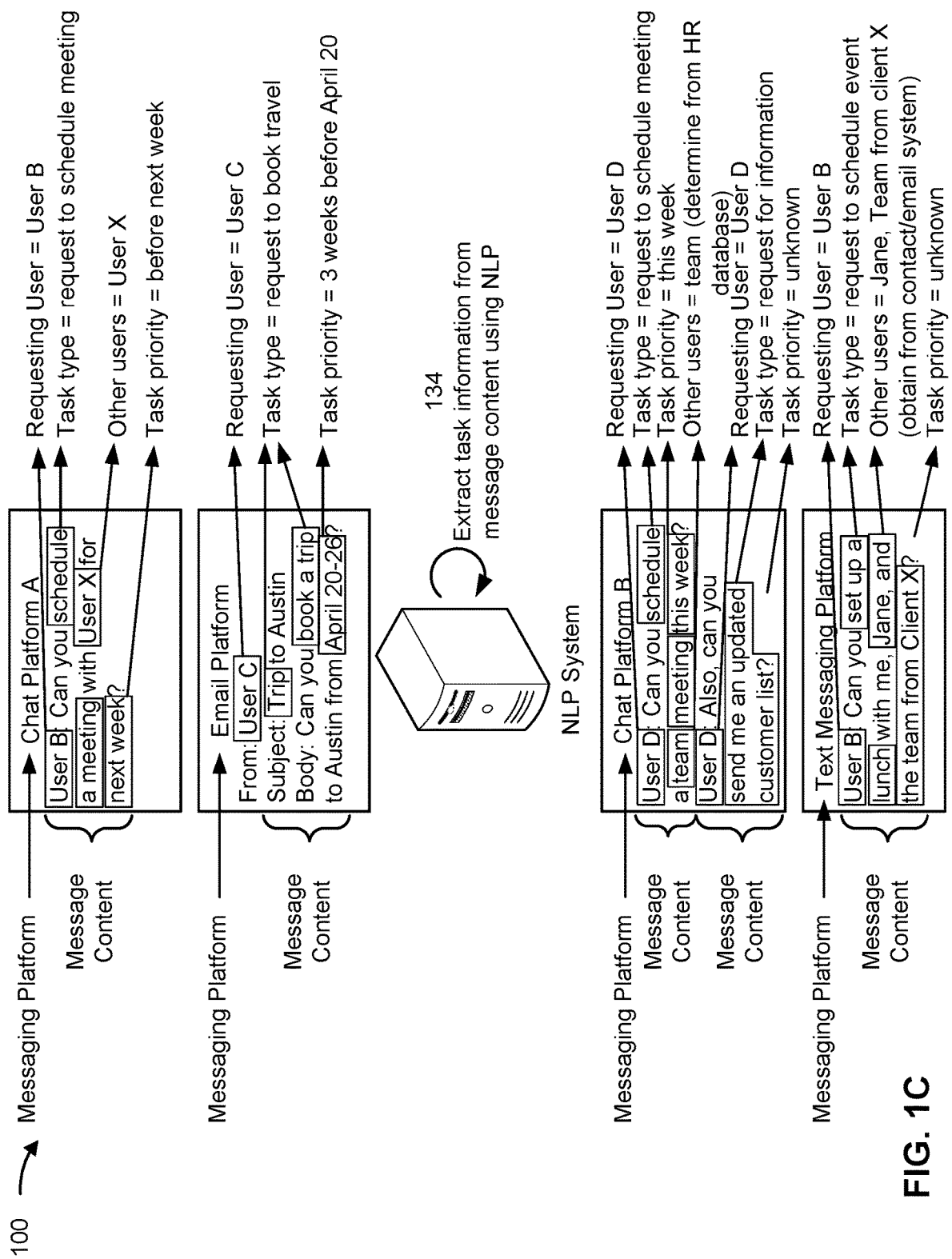

As shown in FIG. 1C, and by reference number 134, the NLP system may receive the message data and may process the message content of the message data to extract task information from the message content. For example, the NLP system may process the message content using natural language processing to extract the task information from the message content. As another example, the NLP system may process the message content to identify one or more keywords and may extract the task information based on the one or more keywords.

The task information may indicate a task type for a task determined from the message content, a task priority for the task, information that identifies the particular user (e.g., that sent the message associated with the message content), and/or information that identifies one or more other users, among other examples. As shown in FIG. 1C, the task type may include, for example, a request to schedule a meeting, a request for information, a request to schedule an event, and/or or a request to book travel arrangements. The task priority may indicate a time or a time period when the task is to be performed (e.g., before next week, 3 weeks before April 20, or this week, as shown in FIG. 1C). The information that identifies the particular user may include information identifying the particular user (e.g., the user B, the user C, or the user D, as shown in FIG. 1C) as a requesting user associated with the task. The information that identifies the one or more other users may identify the one or more users (e.g., user X, team, Jane and the team from Client X, as shown in FIG. 1C) as associated with the task. In some implementations, the NLP system may store the task information in a data structure (e.g., that is included in the NLP system and/or accessible to the NLP system). For example, the NLP may store the task information in an entry of the data structure. The data structure may include information for a plurality of tasks associated with the user A, wherein different tasks of the plurality of tasks are identified based on messages transmitted via different messaging platforms.

In some implementations, the NLP system may determine that the message content does not indicate the task priority. Accordingly, the NLP system may determine the task priority based on at least one of the task type or the identity of the particular user. For example, the NLP system may search, based on the task type or the particular user, the data structure to identify one or more previously determined task priorities that are associated with the task type and/or the particular user. The NLP system may determine the task priority based on the one or more previously determined task priorities (e.g., cause the task priority to be the same as, or similar to, at least one of the one or more previously determined task priorities).

Figure 1D:
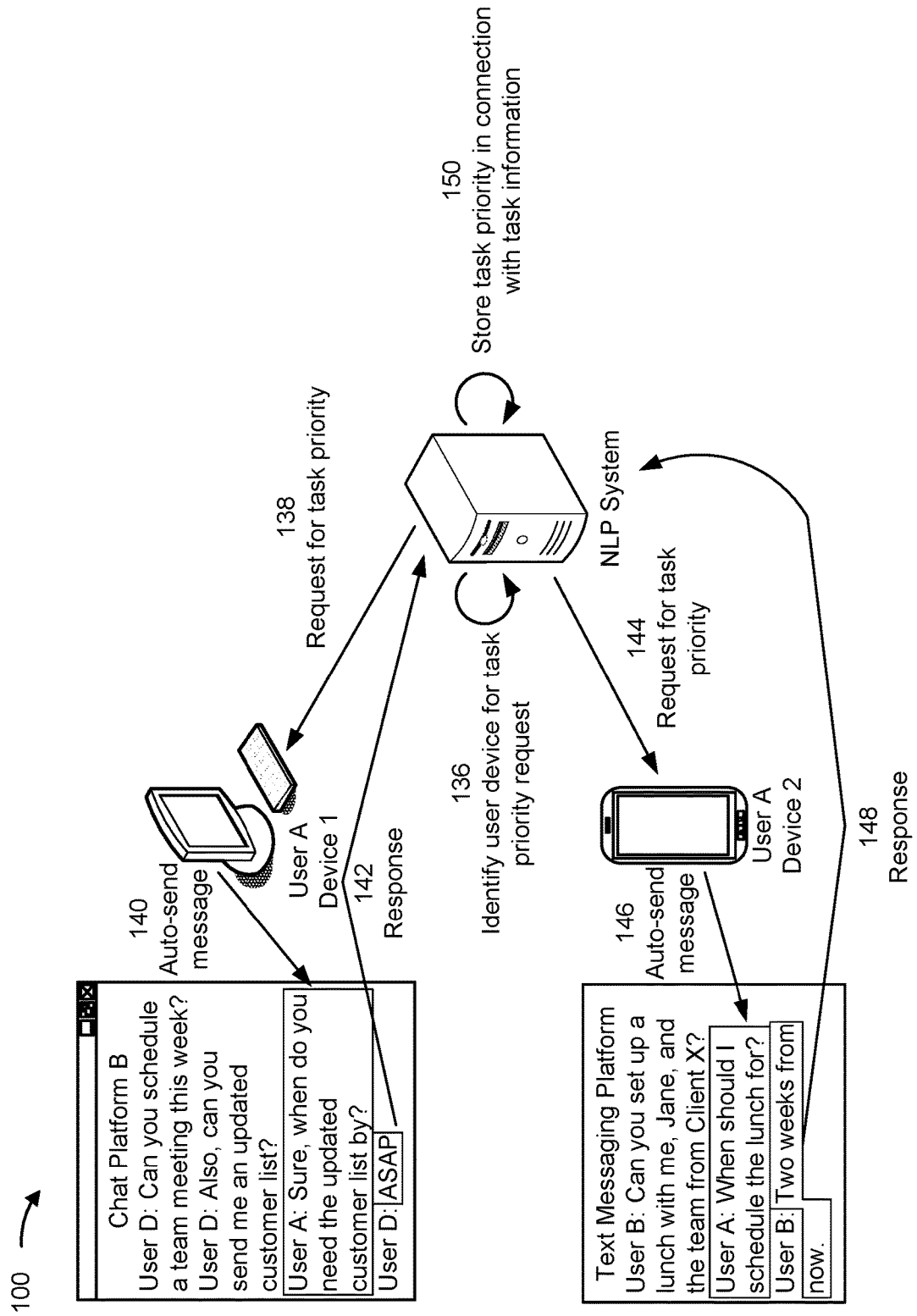

Alternatively, as shown in FIG. 1D, and by reference number 136, the NLP system may identify a user device that is to receive a task priority request. For example, the NLP system may identify, based on receiving the message data from a particular user device (e.g., the user A device 1 or the user A device 2), the particular user device. Accordingly, the NLP system may send the task priority request to the particular user device, which may cause the particular user device to automatically send a request message (e.g., that includes content to ask for the task priority for the task) to the particular user that requested the task (e.g., via the messaging platform indicated by the message data). The particular user may send a response (e.g., via the messaging platform) to the particular user device, which may transmit message data associated with the response the NLP system. Accordingly, the NLP system may process the message data associated with the response to determine the task priority.

For example, as further shown in FIG. 1D, and by reference number 138, when the NLP system identifies the user A device 1 as having the sent the message data, the NLP may send the task priority request to the user A device 1. As shown by reference number 140, the user A device 1, when executing the cross-platform messaging application, may process the task priority request to automatically generate and send a request to the particular user that requested the task (e.g., shown as the user D in FIG. 1D) via the messaging platform indicated by the message data (e.g., the Chat Platform B). As shown by reference number 142, the particular user may send a response (e.g., that indicates the task priority, shown as ASAP in FIG. 1D) via the messaging platform to the user A device 1, which may send message data associated with the response to the NLP system. The NLP system may process the message data associated with the response to identify the task priority.

As an additional example, as further shown in FIG. 1D, and by reference number 144, when the NLP system identifies the user A device 2 as having the sent the message data, the NLP may send the task priority request to the user A device 2. As shown by reference number 146, the user A device 2, when executing the cross-platform messaging application, may process the task priority request to automatically generate and send a request to the particular user that requested the task (e.g., shown as the user B in FIG. 1D) via the messaging platform indicated by the message data (e.g., the Text Messaging Platform). As shown by reference number 148, the particular user may send a response (e.g., that indicates the task priority, shown as "two weeks from now" in FIG. 1D) via the messaging platform to the user A device 2, which may send message data associated with the response to the NLP system. The NLP system may process the message data associated with the response to identify the task priority.

Accordingly, as shown by reference number 150, the NLP system may store the task priority in connection with the task information (e.g., that was extracted by the NLP as described herein in relation to FIG. 1C). For example, the NLP system may store the task priority in the entry of the data structure that includes the task information.

Figure 1E:
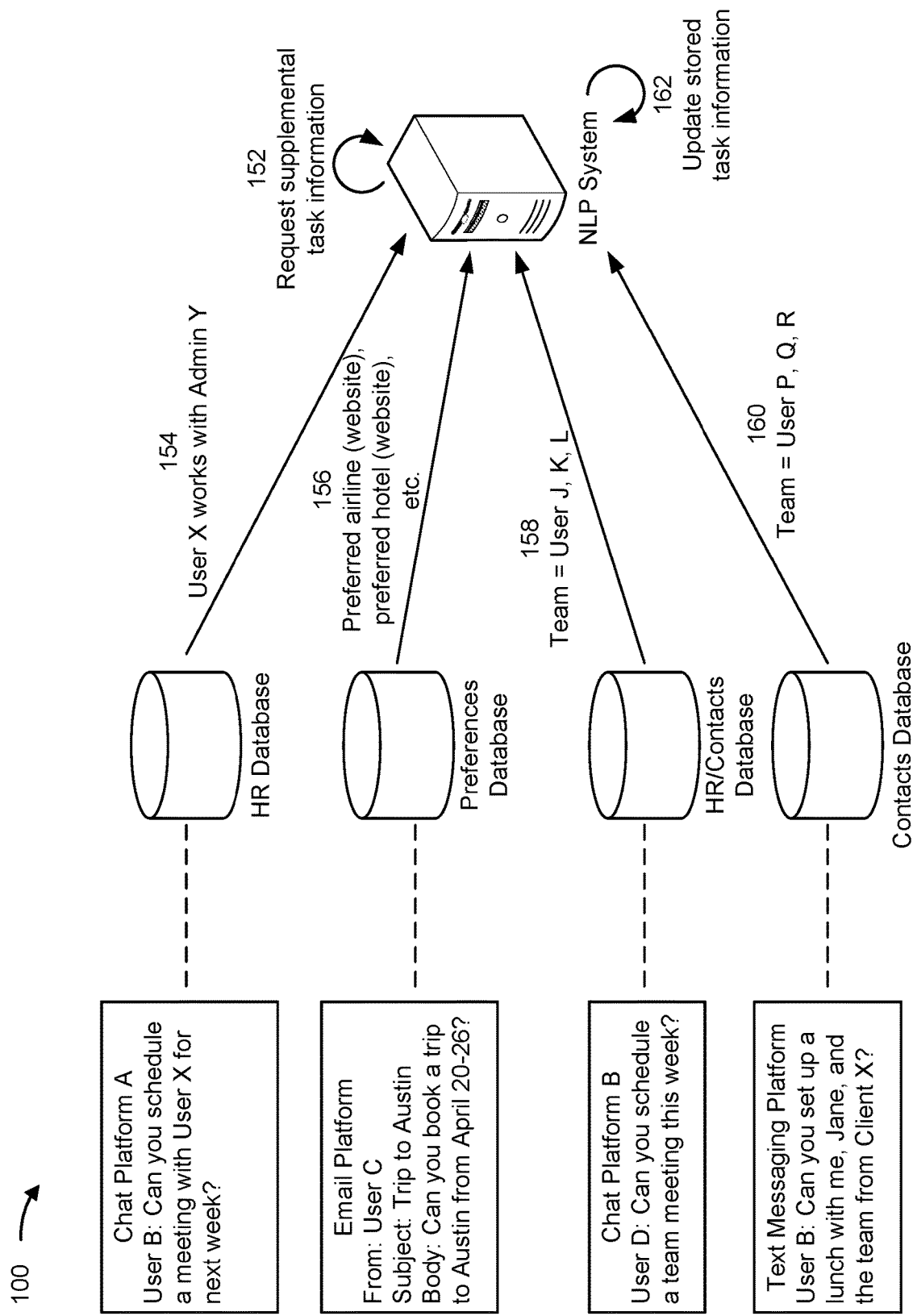

As shown in FIG. 1E, and by reference number 152, the NLP system may request supplemental task information (e.g., to facilitate performance of the task identified by the task information). In some implementations, the NLP system may communicate with at least one of the plurality of databases to obtain the supplemental task information.

For example, as shown by reference number 154, the task information associated with a chat message (e.g., from the user B via the Chat Platform A) may identify user X as associated with a request to schedule a meeting task type (e.g., a user with which the meeting is to be scheduled). Accordingly, the NLP system may communicate, based on identification information associated with the user X, with the HR database to identify that User X works with an administrator (Admin) Y that supports the user X. Accordingly, to facilitate scheduling of the meeting, the NLP system may determine that the Admin Y is to be included in future scheduling messages. Additionally, or alternatively, the NLP system may communicate with the contacts database, based on identification information associated with the Admin Y, to identify contact information associated with the Admin Y. Accordingly, to facilitate scheduling of the event, the NLP system may identify, based on the contact information, a set of messaging platforms and a set of user identifiers associated with the Admin Y. Further, the NLP system may identify, based on the contact information, a preferred messaging platform of the Admin Y (e.g., that is also included in the first set of messaging platforms associated with the user A) and a user identifier of the Admin Y for the preferred messaging platform.

As another example, as shown by reference number 156, the task information associated with an email message (e.g., from the user C via the Email Platform) may identify a request to book travel task type. Accordingly, the NLP system may communicate, based on identification information associated with the user A (e.g., as an administrator that supports the user C) and/or identification information associated with the user C, with the preferences database to identify one or more preferences of the user A and/or the user C, such as a preferred airline, a preferred hotel, or a preferred rental car company of the user A and/or the user C. Accordingly, to facilitate booking of the travel, the NLP system may identify respective links to software tools (e.g., websites or application) associated with the one or more preferences of the user A and/or the user C (e.g., links to software tools associated with the preferred airline, the preferred hotel, or the preferred rental car company).

In an additional example, as shown by reference number 158, the task information associated with a chat message (e.g., from the user D via the Chat Platform B) may identify a "team" as associated with a request to schedule a meeting task type. Accordingly, the NLP system may communicate, based on identification information associated with the user D, with the HR/contacts database to identify, for example, a team of which the user D is a member and identification information and/or contact information associated with one or more other users (e.g., users J, K, and L, as shown in FIG. 1E) that are members of the team. Accordingly, to facilitate scheduling of the meeting, the NLP system may identify, based on the identification information and/or the contact information, a set of messaging platforms and a set of user identifiers associated with at least one of the one or more other users.

In another example, as shown by reference number 160, the task information associated with a text message (e.g., from the user B via the Text Messaging Platform) may identify "Jane" and "the team from Client X" as associated with a request to schedule event task type. Accordingly, the NLP system may communicate, based on identification information associated with Jane and the team from Client X, with the contacts database to identify, for example, contact information associated with Jane and/or at least one member of the team from Client X (e.g., that includes members P, Q, and R, as shown in FIG. 1 E). Accordingly, to facilitate scheduling of the event, the NLP system may identify, based on the contact information, a set of messaging platforms and a set of user identifiers associated with Jane and/or the at least one member of the team from Client X.

Accordingly, as shown by reference number 162, the NLP system may update the stored task information to include the supplemental task information (e.g., that was determined by the NLP system, as described in relation to reference numbers 152-160). For example, the NLP system may update entry of the data structure that includes the task information to further include the supplemental task information.

Figure 1F:
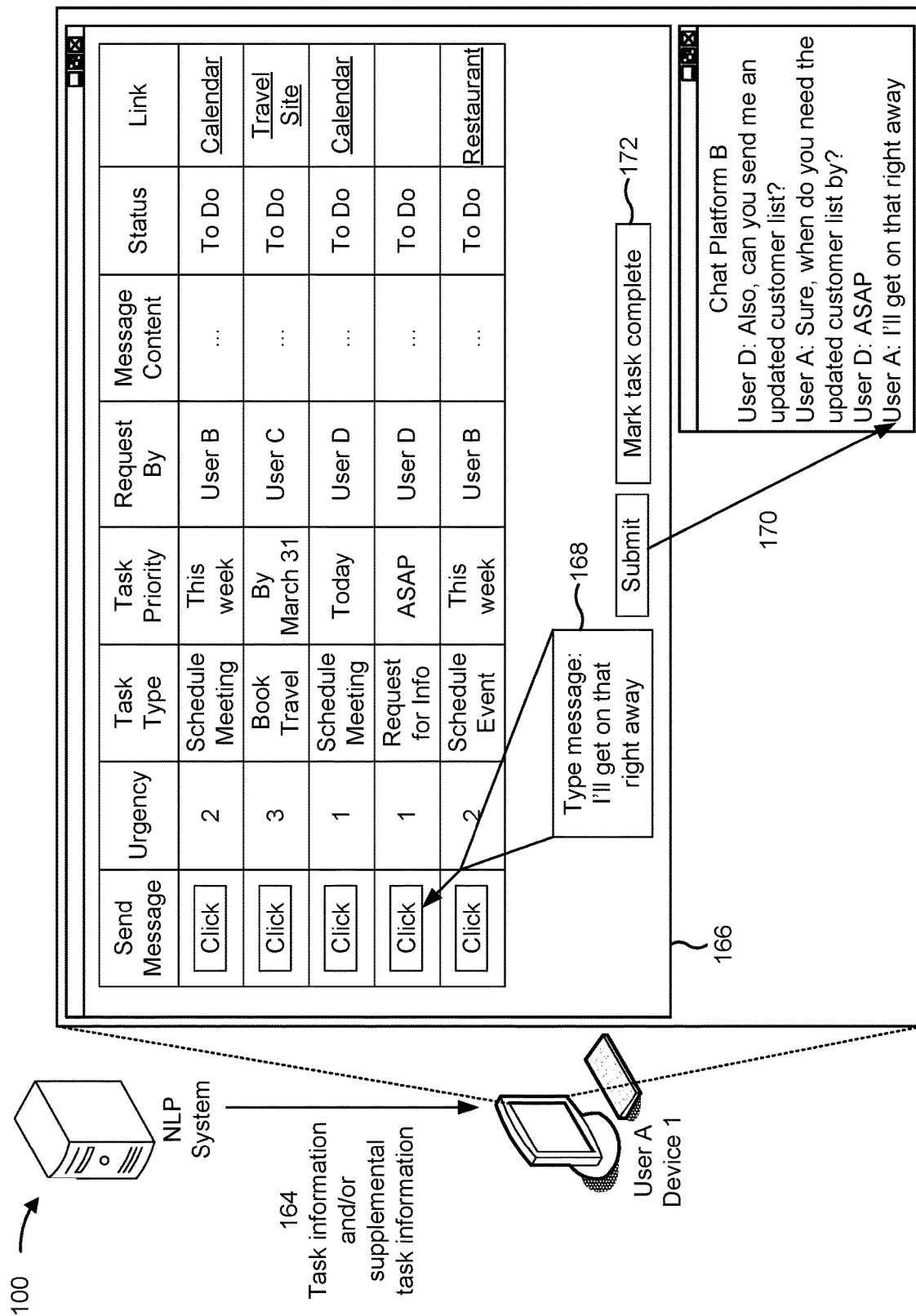

As shown in FIG. 1F, and by reference number 164, the NLP system may transmit the task information and/or the supplemental task information (e.g., in association with the task information) to at least one user device associated with the user A (e.g., shown as user A device 1 in FIG. 1F), such as a user device that is executing the cross-platform messaging application. In some implementations, the user device may store the task information and/or the supplement task information in a data structure (e.g., that is included in the user device and/or is accessible to the user device). For example, the user device may store the task information and/or the supplemental task information in an entry of the data structure.

In some implementations, the user device may present the task information and/or the supplemental task information. For example, the user device, when executing the cross-platform messaging application, may present the task information and/or the supplemental task information via a user interface 166 of the cross-platform messaging application. As shown in FIG. 1F, the user interface 166 may include a task list that includes information for a plurality of tasks. An entry of the task list may indicate a task type of a task, a task priority for the task, an urgency associated with the task, a requester of the task, message content associated with the task, a status associated with the task, and/or a link (e.g., a link to a software tool to assist with performing the task), among other examples. The user device may determine (e.g., for presentation via the user interface 166) the task type, the task priority, and the requester of the task based on the task information. The user device may determine (e.g., for presentation via the user interface) the link based on the supplemental task information. The user device may determine the urgency associated with the task based on the task priority. For example, the user device may determine a high urgency, indicated by the number 1, when the task needs to be performed as soon as possible or within the next day; a medium urgency, indicated by the number 2, when the task needs to be performed within the next week; and/or a low urgency, indicated by the number 3, when the task needs to be accomplished any other time. The user device may determine the message content based on the message data that the user device transmitted to the NLP system. The user device may maintain the status associated with the task based on input by the user A, as described below.

In some implementations, the entry of the task list may include a user input element (e.g., a "click" button) that enables the user device to communicate, via the cross-platform messaging application, using a messaging platform that is associated with the task (e.g., the messaging platform that was used to transmit the message associated with the task, a messaging platform of a set of messaging platforms identified by the task information and/or the supplemental task information, or a preferred messaging platform identified by the task information and/or the supplemental task information, among other examples). For example, the user A may select the user input element to cause the cross-platform messaging application to display, via the user interface 166, a message composition window 168. The user may input a custom message into the message composition window 168 or may select a prepared message (e.g., that is automatically generated by the cross-platform messaging application). The user then may interact with the message composition window 168 (e.g., by selecting a "submit" button). The user device may detect the user interaction and may cause, as shown by reference number 170, the message to be sent to the requester of the task (or another user associated with the task, such as an administrative assistant associated with the requester of the task) via the messaging platform. Accordingly, the message may be sent to a user device associated with the requester (or the other user) to cause the message to be presented on the user device (e.g., via a user interface of the messaging platform).

In some implementations, the user A may interact with the user interface 166 (e.g., by selecting a "mark task complete" button indicated by reference number 172) to indicate that an action has been performed in connection with the task. Accordingly, the user device may update a status associated with the task (e.g., change the status from "to do" to "complete") and/or may update the data structure (e.g., update the entry associated with the task information and/or the supplemental task information) to indicate that the action has been performed in connection with the task. In some implementations, the user A may edit task information associated with a task (e.g., a task urgency, a task type, a task priority, and/or a task status), such as by interacting with a portion of the user interface 166 that displays the task information and inputting new task information. The user device may update the task information with the new task information and/or may update the data structure (e.g., update the entry associated with the task information and/or the supplemental task information) to indicate that the action has been performed in connection with the task. In some implementations, the user device may transmit updates to the NLP system and/or the host system o update a data structure stored by the NLP system and/or the host system.

The user interface 166 of FIG. 1F shows an example view for User A, who is associated with a first role (e.g., an administrative role). In some implementations, a user device of a first user associated with the first role may be able to receive, edit, and/or view task information for multiple users, such as multiple users in a second role (e.g., a director role) that is supported by the first role and/or the first user. In some implementations, a user device of a second user associated with the second role (e.g., the director role) may be able to review, edit, and/or view only task information associated with the second user, and not other users (e.g., other users having the first role or the second role). In this way, data privacy may be maintained.

As indicated above, FIGS. 1A-1F are provided as an example. Other examples may differ from what is described with regard to FIGS. 1A-1F.

Figure 2:
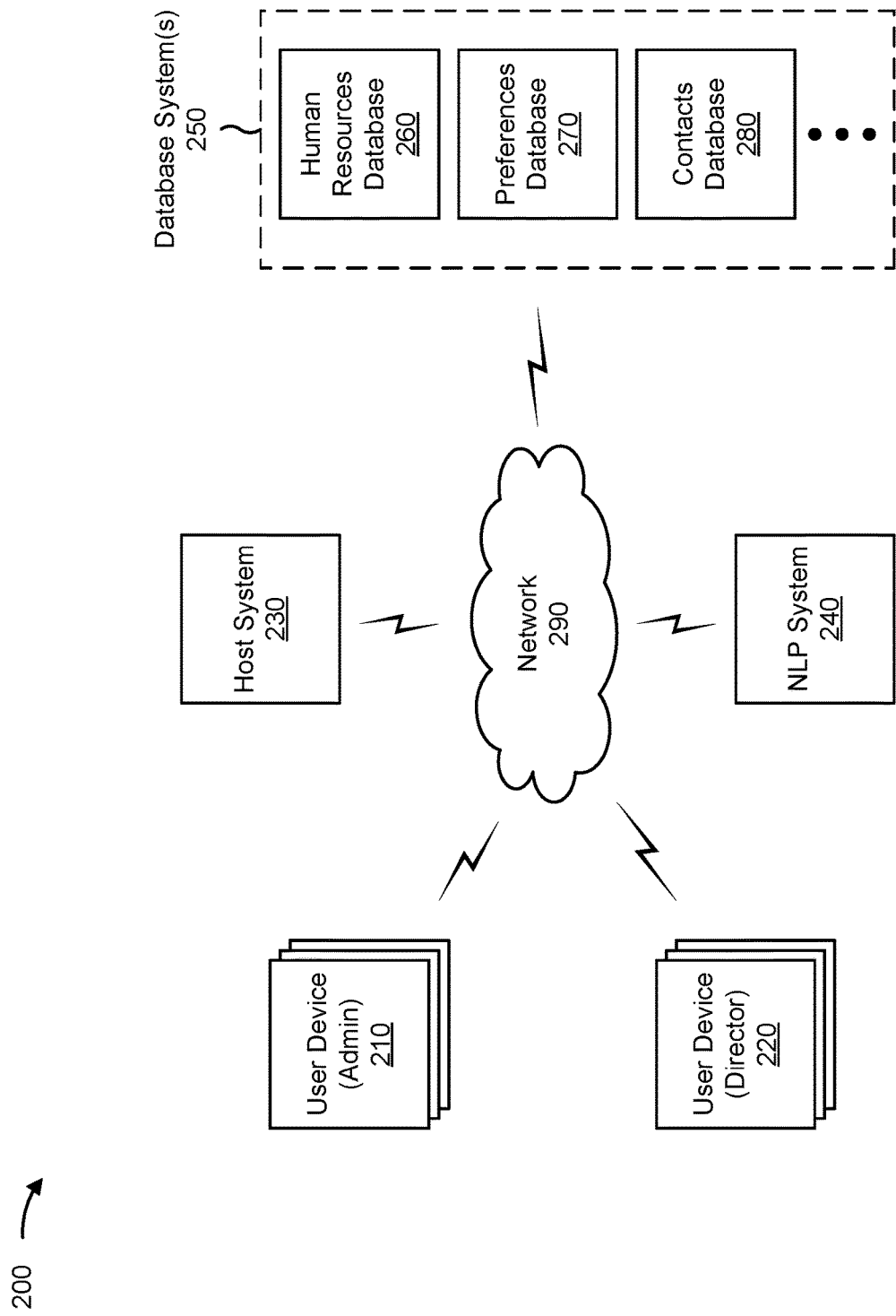
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a user device 220, a host system 230, an NLP system 240, one or more database systems 250 (e.g., that includes a human resources database 260, a preferences database 270, and/or a contacts database 280, among other examples), and a network 290. Devices of environment 200 may interconnect via wired connections, wireless connections, or a combination of wired and wireless connections.

The user device 210 includes one or more devices capable of receiving, generating, storing, processing, and/or providing information associated with using natural language processing to enable communication across messaging platforms, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 210 may be associated with a user that has an administrative role within an entity. The user device 210 may communicate with one or more other devices of environment 200, as described elsewhere herein.

The user device 220 includes one or more devices capable of receiving, generating, storing, processing, and/or providing information associated with using natural language processing to enable communication across messaging platforms, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 220 may be associated with a user that has a director role within an entity. The user device 220 may communicate with one or more other devices of environment 200, as described elsewhere herein.

The host system 230 includes one or more devices capable of receiving, generating, storing, processing, and/or providing information associated with using natural language processing to enable communication across messaging platforms, as described elsewhere herein. The host system 230 may include a communication device and/or a computing device. For example, the host system 230 may include a server, an application server, a client server, a web server, a database server, a host server, a proxy server, a virtual server (e. g., executing on computing hardware), a device that includes computing hardware used in a cloud computing environment, or a similar type of device. The host system 230 may communicate with one or more other devices of environment 200, as described elsewhere herein. In some implementations, the host system 230 may communicate with the user device 210 to obtain registration information or to facilitate authentication of the user device 210, as described elsewhere herein.

The NLP system 240 includes one or more devices capable of receiving, generating, storing, processing, and/or providing information associated with using natural language processing to enable communication across messaging platforms, as described elsewhere herein. The NLP system 240 may include a communication device and/or a computing device. For example, the NLP system 240 may include a server, an application server, a client server, a web server, a database server, a host server, a proxy server, a virtual server (e. g., executing on computing hardware), a device that includes computing hardware used in a cloud computing environment, or a similar type of device. The NLP system 240 may communicate with one or more other devices of environment 200, as described elsewhere herein. In some implementations, the NLP system 240 may extract task information associated with message data and provide the task information to the user device 210, as described elsewhere herein.

The database system 250 includes one or more devices capable of receiving, generating, storing, processing, and/or providing information associated with using natural language processing to enable communication across messaging platforms, as described elsewhere herein. The database system 250 may include a communication device and/or a computing device. For example, the database system 250 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the database system 250 may include the human resources database 260, the preferences database 270, and/or the contacts database 280. The database system 250 may communicate with one or more other devices of environment 200, as described elsewhere herein.

The network 290 includes one or more wired and/or wireless networks. For example, the network 290 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 290 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
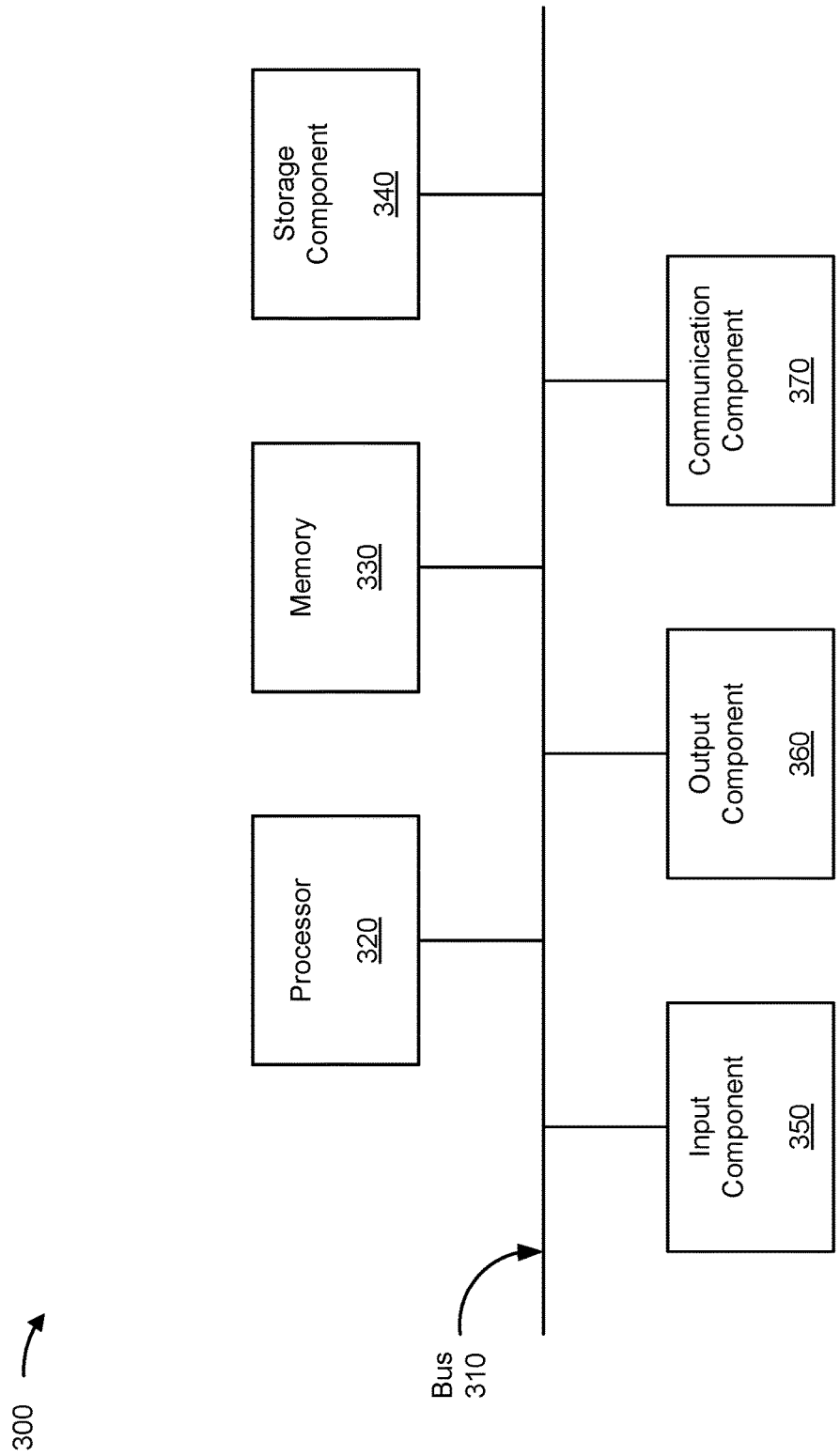
FIG. 3 is a diagram of example components of one or more devices of FIG. 2.

FIG. 3 is a diagram of example components of a device 300, which may correspond to the user device 210, the user device 220, the host system 230, the NLP system 240, and/or the database system 250. In some implementations, the user device 210, the user device 220, the host system 230, the NLP system 240, and/or the database system 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
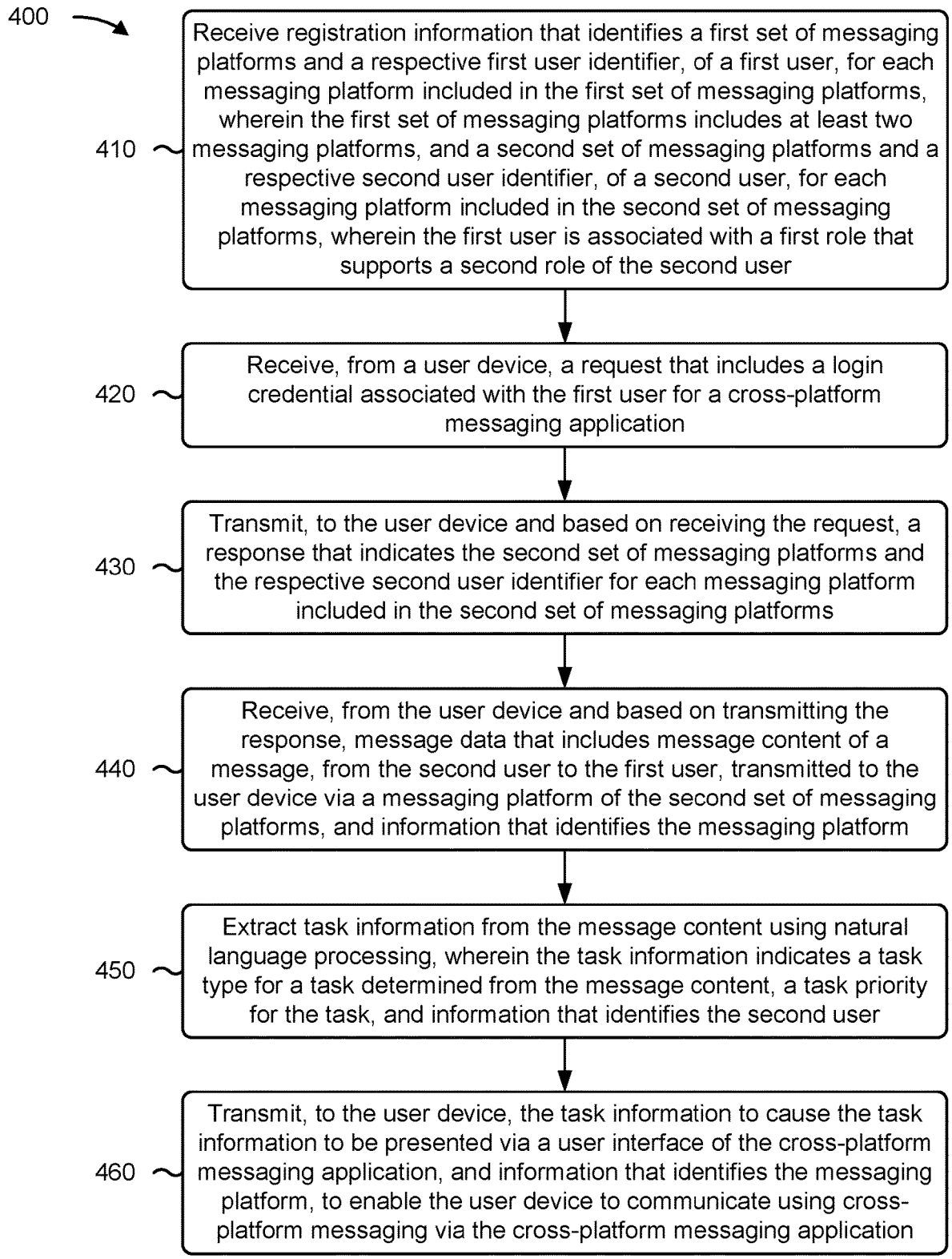

FIG. 4 is a flowchart of an example process 400 associated with using natural language processing to enable communication across messaging platforms. In some implementations, one or more process blocks of FIG. 4 may be performed by a system (e.g., host system 230 and/or NLP system 240). In some implementations, one or more process blocks of FIG. 4 may be performed by another device or a group of devices separate from or including the system, such as a user device (e.g., user device 210 and/or user device 220) and/or a database system (e.g., database system 250). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving registration information that identifies a first set of messaging platforms and a respective first user identifier, of a first user, for each messaging platform included in the first set of messaging platforms (block 410). In some implementations, the first set of messaging platforms includes at least two messaging platforms, and a second set of messaging platforms and a respective second user identifier, of a second user, for each messaging platform included in the second set of messaging platforms, wherein the first user is associated with a first role that supports a second role of the second user. As further shown in FIG. 4, process 400 may include receiving, from a user device associated with the first user, a request that includes a login credential associated with the first user for a cross-platform messaging application (block 420). As further shown in FIG. 4, process 400 may include transmitting, to the user device and based on receiving the request, a response that indicates the second set of messaging platforms and the respective second user identifier for each messaging platform included in the second set of messaging platforms (block 430). As further shown in FIG. 4, process 400 may include receiving, from the user device and based on transmitting the response, message data that includes: message content of a message, from the second user to the first user, transmitted to the user device via a messaging platform of the second set of messaging platforms, and information that identifies the messaging platform (block 440). As further shown in FIG. 4, process 400 may include extracting task information from the message content using natural language processing, wherein the task information indicates a task type for a task determined from the message content, a task priority for the task, and information that identifies the second user (block 450). As further shown in FIG. 4, process 400 may include transmitting, to the user device: the task information to cause the task information to be presented via a user interface of the cross-platform messaging application, and information that identifies the messaging platform, to enable the user device to communicate using cross-platform messaging via the cross-platform messaging application (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with using natural language processing to enable communication across messaging platforms. In some implementations, one or more process blocks of FIG. 5 may be performed by a user device (e.g., user device 210 and/or user device 220). In some implementations, one or more process blocks of FIG. 5 may be performed by another device or a group of devices separate from or including the user device, such as a system (e.g., host system 230 and/or NLP system 240) and/or a database system (e.g., database system 250). Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include transmitting a request that includes a login credential associated with a first user of a cross-platform messaging application executing on the user device, wherein the first user is associated with a set of first user identifiers for a corresponding first set of messaging platforms (block 510). As further shown in FIG. 5, process 500 may include receiving, based on transmitting the request, a response that indicates one or more messaging platforms and a respective second user identifier, associated with a second user, for each of the one or more messaging platforms (block 520). As further shown in FIG. 5, process 500 may include detecting a message received via a messaging platform of the one or more messaging platforms (block 530). As further shown in FIG. 5, process 500 may include determining that the message is from the second user based on a match between a user identifier associated with the message and the respective second user identifier corresponding to the messaging platform for the second user (block 540). As further shown in FIG. 5, process 500 may include transmitting, based on determining that the message is from the second user, message data that includes: message content of the message, and information that identifies the messaging platform used to transmit the message (block 550). As further shown in FIG. 5, process 500 may include receiving, by the user device and based on transmitting the message data: task information that indicates a task type for a task determined from the message content, a task priority for the task, and information that identifies the second user, and information that identifies the messaging platform (block 560). As further shown in FIG. 5, process 500 may include presenting the task information via a user interface of the cross-platform messaging application executing on the user device (block 570).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for using natural language processing to enable communication across messaging platforms, the system comprising:
   one or more memories; and
   one or more processors, communicatively coupled to the one or more memories, configured to:
     receive registration information that identifies:
       a first set of messaging platforms and a respective first user identifier, of a first user, for each messaging platform included in the first set of messaging platforms, wherein the first set of messaging platforms includes at least two messaging platforms, and
       a second set of messaging platforms and a respective second user identifier, of a second user, for each messaging platform included in the second set of messaging platforms, wherein the first user is associated with a first role that supports a second role of the second user;
     receive, from a user device associated with the first user, a request that includes a login credential associated with the first user for a cross-platform messaging application;
     transmit, to the user device and based on receiving the request, a response that indicates the second set of messaging platforms and the respective second user identifier for each messaging platform included in the second set of messaging platforms;
     receive, from the user device and based on transmitting the response, message data that includes:
       message content of a message, from the second user to the first user, transmitted to the user device via a messaging platform of the second set of messaging platforms, and
       information that identifies the messaging platform;
     extract task information from the message content using natural language processing, wherein the task information indicates a task type for a task determined from the message content, a task priority for the task, and information that identifies the second user;
     identify, based on the task information, a particular preferred messaging platform, of the first set of messaging platforms or the second set of messaging platforms; and
     transmit, to the user device:
       the task information to cause the task information to be presented via a user interface of the cross-platform messaging application,
         wherein the user interface includes a particular user input element that enables the user device to communicate using the particular preferred messaging platform, and
       information that identifies the messaging platform, to enable the user device to communicate using cross-platform messaging via the cross-platform messaging application.

2. The system of claim 1, wherein the one or more processors, to extract the task information, are configured to determine the task type based on one or more keywords included in the message content.

3. The system of claim 1, wherein the task type includes one of a request to schedule a meeting, a request for information, a request to schedule an event, or a request to book travel arrangements.

4. The system of claim 1, wherein the one or more processors, to extract the task information, are configured to determine the task priority based on at least one of the task type or the second user.

5. The system of claim 1, wherein the one or more processors, to extract the task information, are configured to:
   determine that the message content does not indicate the task priority;
   transmit, to the user device, information that causes a request message to be sent to the second user via the messaging platform, wherein the request message includes content to ask for the task priority; and
   receive, from the user device, information that indicates the task priority based on transmitting the information that causes the request message to be sent to the second user via the messaging platform.

6. The system of claim 1, wherein the one or more processors are further configured to:
   identify a link to a software tool to assist with performing the task based on at least one of the task type, a preference of the first user indicated in the registration information, or a preference of the second user indicated in the registration information; and
   transmit the link to the user device, in association with the task information, to cause the link to be presented via the user interface of the cross-platform messaging application.

7. The system of claim 1, wherein the task type is a request to schedule a meeting and the task information further includes information that identifies a third user with which the meeting is to be scheduled; and
   wherein the one or more processors are further configured to:
   identify a fourth user that supports the third user based on information obtained from a database;
   identify a preferred messaging platform, of the first set of messaging platforms, associated with the fourth user;
   determine a user identifier of the fourth user for the preferred messaging platform based on information obtained from the database; and
   transmit, to the user device and in association with the task information, information that identifies the user identifier of the fourth user and that identifies the preferred messaging platform, to cause the user identifier of the fourth user and information that identifies the preferred messaging platform to be presented via the user interface of the cross-platform messaging application.

8. The system of claim 1, wherein the one or more processors are further configured to:
   store the task information in a data structure that includes information for a plurality of tasks associated with the first user, wherein different tasks of the plurality of tasks are identified based on messages transmitted via different messaging platforms;
   receive, from the user device, an indication that an action has been performed in connection with the task; and
   update the data structure with the indication that the action has been performed in connection with the task.

9. A method for communicating across messaging platforms, comprising:
   transmitting, by a user device, a request that includes a login credential associated with a first user of a cross-platform messaging application executing on the user device, wherein the first user is associated with a set of first user identifiers for a corresponding first set of messaging platforms;
   receiving, by the user device and based on transmitting the request, a response that indicates one or more messaging platforms and a respective second user identifier, associated with a second user, for each of the one or more messaging platforms;
   detecting, by the user device, a message received via a messaging platform of the one or more messaging platforms;
   determining, by the user device, that the message is from the second user based on a match between a user identifier associated with the message and the respective second user identifier corresponding to the messaging platform for the second user;
   transmitting, by the user device and based on determining that the message is from the second user, message data that includes:
   message content of the message, and
   information that identifies the messaging platform used to transmit the message;
   receiving, by the user device and based on transmitting the message data:
   task information that indicates a task type for a task determined from the message content, a task priority for the task, and information that identifies the second user, and
   information that identifies the messaging platform;
   identifying, by the user device and based on the task information, a particular preferred messaging platform of the one or more messaging platforms; and
   presenting, by the user device, the task information via a user interface of the cross-platform messaging application executing on the user device,
   wherein the user interface includes a particular user input element that enables the user device to communicate using the particular preferred messaging platform.

10. The method of claim 9, wherein presenting the task information comprises presenting a task list that includes information for a plurality of tasks including the task, wherein the task list indicates the task type, the task priority, and the information that identifies the second user; and
   further comprising presenting a user input element that enables the user device to communicate via the cross-platform messaging application using the messaging platform and a second user identifier of the second user for the messaging platform.

11. The method of claim 10, further comprising:
   detecting a user interaction with the user input element; and
   transmitting a message to a second user device, associated with the second user, using the messaging platform, the second user identifier, and a first user identifier of the first user for the messaging platform.

12. The method of claim 10, wherein the task information further includes a link to a software tool to assist with performing the task based on at least one of the task type, a preference of the first user, or a preference of the second user; and
   wherein the task list includes the link.

13. The method of claim 9, wherein the task type is a request to schedule a meeting and the task information further includes information that identifies a third user with which the meeting is to be scheduled, a fourth user that supports the third user, a preferred messaging platform associated with the fourth user, and a user identifier of the fourth user for the preferred messaging platform; and
   further comprising presenting a user input element that enables the user device to communicate via the cross-platform messaging application using the preferred messaging platform and the user identifier of the fourth user for the preferred messaging platform.

14. The method of claim 9, wherein the corresponding first set of messaging platforms includes at least two of an email messaging platform, a chat messaging platform, or a text messaging platform.

15. The method of claim 9, further comprising determining that the message includes a task tag; and
   wherein transmitting the message data comprises transmitting the message data based on determining that the message includes the task tag.

16. A non-transitory computer-readable medium storing a set of instructions, the set of instructions comprising:
   one or more instructions that, when executed by one or more processors of a user device, cause the user device to:
   transmit a request that includes a login credential associated with a first user of a cross-platform messaging application executing on the user device, wherein the first user is associated with a set of first user identifiers for a corresponding first set of messaging platforms;
   receive, based on transmitting the request, a response that indicates one or more messaging platforms and a respective second user identifier, associated with a second user, for each of the one or more messaging platforms;

detect a message received via a messaging platform of the one or more messaging platforms;

determine that the message is from the second user based on a match between a user identifier associated with the message and the respective second user identifier corresponding to the messaging platform for the second user;

transmit, based on determining that the message is from the second user, message data that includes:
message content of the message, and
information that identifies the messaging platform used to transmit the message;

receive, by the user device and based on transmitting the message data:
task information that indicates a task type for a task determined from the message content, a task priority for the task, and information that identifies the second user, and
information that identifies the messaging platform;

identify, based on the task information, a particular preferred messaging platform, of the one or more messaging platforms; and present the task information via a user interface of the cross-platform messaging application executing on the user device,
wherein the user interface includes a particular user input element that enables the user device to communicate using the particular preferred messaging platform.

17. The non-transitory computer-readable medium of claim 16, wherein presenting the task information comprises presenting a task list that includes information for a plurality of tasks including the task, wherein the task list indicates the task type, the task priority, and the information that identifies the second user; and wherein the one or more instructions further cause the user device to present a user input element that enables the user device to communicate via the cross-platform messaging application using the messaging platform and a second user identifier of the second user for the messaging platform.

18. The non-transitory computer-readable medium of claim 17, wherein the one or more instructions further cause the user device to:

detect a user interaction with the user input element; and transmit a message to a second user device, associated with the second user, using the messaging platform, the second user identifier, and a first user identifier of the first user for the messaging platform.

19. The non-transitory computer-readable medium of claim 17, wherein the task information further includes a link to a software tool to assist with performing the task based on at least one of the task type, a preference of the first user, or a preference of the second user; and wherein the task list includes the link.

20. The non-transitory computer-readable medium of claim 16, wherein the task type is a request to schedule a meeting and the task information further includes information that identifies a third user with which the meeting is to be scheduled, a fourth user that supports the third user, a preferred messaging platform associated with the fourth user, and a user identifier of the fourth user for the preferred messaging platform; and wherein the one or more instructions further cause the user device to present a user input element that enables the user device to communicate via the cross-platform messaging application using the preferred messaging platform and the user identifier of the fourth user for the preferred messaging platform.

* * * * *